3,252,855
METHOD OF CONTROLLING ALGAL GROWTH

Donald Clifford Wehner, Fairfield, Conn., assignor to American Cyanamid Company, Stamford, Conn., a corporation of Maine
No Drawing. Filed Aug. 10, 1965, Ser. No. 478,740
4 Claims. (Cl. 167—22)

This application is a continuation-in-part application of Serial No. 142,760, filed October 4, 1961, now abandoned.

This invention relates in general to the control of microorganisms which present problems in various industrial applications. It is particularly directed to methods for arresting or eradicating infestation of deleterious algal growths and other microorganisms harmful to industrial systems.

The novel antimicrobial agents of the present invention and the methods of control which involve their use are characterized in that the principal ingredient is selected from the group consisting of methylene bisthiocyanate,

NCS—CH$_2$—SCN and monohalomethyl thiocyanate,

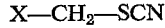

X—CH$_2$—SCN wherein X is an atom of chlorine, bromine, iodine or fluorine.

It has been found that when one or more of the aforesaid compounds is introduced into a medium to be protected in quantities of at least 0.5 p.p.m. a rapid diminution in microbial deterioration is seen to occur and a strong preservative effect is noted in the medium. It has particularly been found that a wide range of microorganisms of both plant and animal nature are removed by treatment with the instantly disclosed novel antimicrobial agent. As a consequence the infested medium shows evidence of a marked improvement in stability and freedom from deterioration.

A principal object of the invention, therefore, is to provide a method of inhibiting microbial growths, particularly algae, by contacting these growths with organic thiocyanate compounds.

This and other objects, features, and advantages of the invention will become more apparent from the following description.

Accordingly, it has been discovered that industrial systems subject to infestation with microorganisms, particularly algae, may be rendered free thereof by treatment of the infested materials in the system with a minor but effective amount of a composition comprising a compound selected from the group consisting of methylene bisthiocyanate and monohalomethyl thiocyanate. These antimicrobial agents may be employed singly, in mixtures of two or more, or in company with diluents, carriers, solvents or the like either prior to or following infestation with the interfering microorganisms. As a result of treatment of the infested material whether by spraying, direct addition into the formula or other recognized methods of application, it has been found that these organic thiocyanates render the material treated extremely resistant to further infection, inhibit degradation thereof and act as preservatives for the material.

The term degradation inhibitor may be employed to generally characterize the active ingredient of this invention. By this term is meant a chemical agent which will both retard and/or totally prevent the growth of microorganisms, particularly algae, and substantially prolong and preserve the life of any material, liquid or solid, to which it may be added.

Contrary to what has been observed in the past, the organic thiocyanates of the present invention demonstrate no specificity for any particular microorganism but rather demonstrate a broad spectrum of high level toxicity for a large number of distinctly different and unrelated microorganisms, including algae, fungi, bacteria, spores, and the like. The only practical limitation which has been observed as to their activity is the question of their effectiveness in the particular material or system they are to preserve which must be determined on the basis of trial in each case.

In this regard the compounds are particularly effective at concentrations less than about 13 p.p.m. against growth of bacteria of the species Bacillus, Aerobacter, Pseudomonas, and Desulfovibrio; fungi of the species Pullularia, Aspergillus, Penicillium, Chaetomium, Myrothecium, Memnonellia, Fusarium, Lenzites, Lentinus, Poria, Certostomella, Spicaria, Trichoderma, and Philalophoria; and algae of the species Chlorella, Oscillatoria, Ankistrodesmus, Chlamydomonas, and Phormidium.

The subject compounds have been found effective in treating process water of a number of industrial systems and materials subject to deterioration by the activity of various microorganisms. For instance, the compounds may be employed in keeping paper mill water systems free from slime and algae when employed at a concentration of 25 p.p.m or less. The use of about 20 p.p.m. or less will protect cooling towers and heat exchanger equipment carrying aqueous fluids from microbial growth of various origins which unchecked will cause corrosion and consequent loss of cooling capacity in the system. Addition of 0.1 to 1% of the compounds to coating materials, adhesive compositions, sizes, glue, caulking compounds, latex emulsions, starch solutions, and polymer systems such as polyacrylamide solutions will prevent discoloration and disfigurement of these materials by microbial degradation.

Incorporation of amounts ranging from about 0.05 to 1% to oleaginous liquids will render them mildew resistant and preserve them from degradation and deterioration by fungal activity while in storage. Quantities of the order of 25 p.p.m. or less of the compounds when added to oil well brines and the like will effectively control microbial growth which otherwise would cause plugging of pipe lines and corrosion of production equipment. A quantity in the order of 500 p.p.m or less added to drilling muds will protect the starches and gums contained therein from algal and bacterial attack, particularly by sulfate reducing bacteria of the Desulfovibrio type, thus preventing corrosion and failure of oil well casing. The use of quantities of the order of 250 p.p.m. or less in a washing or spraying solution employed for treating packed fruits and vegetables will drastically reduce the number of fungi and bacterial present and improve the keeping quality and storage life of the produce.

In the field of plastic manufacture, addition of amounts of the order of 1% or less of the total composition will render the finished product mildew and algae resistant and thus prevent deterioration or disfigurement of the molded products such as shower curtains, bath mats and the like. Moreover, treatment of wood with the compound of the instant composition by spraying or soaking will retard subsequent rot of the wood evidenced by discoloration and weakness thereof. Further, the inclusion of amounts of 150 p.p.m. or less in cutting oils has been found to prevent spoilage and offensive odors in the liquid and improvement therein.

The organic thiocyanate compounds of the invention are particularly effective against algal growths of all species wherever they occur. For example, they are effective auxiliaries with chlorine in swimming pools where "black" algae thrive. This algal species is resistant to the maximum levels of chlorine generally permitted by public health regulations. Moreover, since algae are food for bacteria, control of algae by use of the organic thiocyanates of the invention prevents even the beginning of bacterial infestation, although the compounds are also effective against pre-existing bacteria as already described. Thus the compounds control substantially all microbial growth in industrial process waters, whether in the nature of paper mill holding ponds, cooling tanks, aeration ponds used to separate oil from fresh or saline water floods in secondary oil recovery, and the like.

An advantage of the organic thiocyanates of the present invention is that they can be prepared by an inexpensive synthesis from readily available starting materials. For example, methylene bisthiocyanate is prepared by first reacting approximately one mole of methylene chloride with a small amount of sodium iodide and hydrochloric acid in acetone solvent and thereafter reacting the resulting product with stoichiometric quantities of sodium thiocyanate added as a dry powder under conventional refluxing temperatures and conditions. The monohalomethyl thiocyanates are prepared by a similar convenient route, as described for example, in German Patent 1,157,603.

It is, of course, understood that the organic thiocyanates may constitute either the sole or principal active ingredient of a composition containing a number of ingredients. When treating large surface areas it is preferred to blend the active ingredient with a large quantity of an organic alcohol, such as methanol, ethanol and the like. In those cases where it is decided to introduce the organic thiocyanates of the invention into a plastics formulation, one may of course include a plasticizing agent such as dibutylphthalate. In general, the choice of the particular liquid carrier employed is guided by prevailing circumstances such as its availability and cost and its solubility and dispersion characteristics toward the active ingredients.

From the foregoing it will be appreciated that for biocidal purposes very low concentrations of the active ingredients are effective for inhibiting the various forms of plant and animal life. For optimum results amounts ranging from 0.5 p.p.m. to about 10,000 p.p.m. of the active ingredient may be applied by any one of a number of convenient means. These include, for example, the use of nonaqueous solutions or the use of a suspension, emulsion or dispersion either aqueous or nonaqueous. In this regard, the monohalomethyl thiocyanates are preferred over methylene bisthiocyanate since the latter compound is a somewhat difficultly soluble solid whereas the former compounds are easily dispersed liquids.

Formulations containing the active ingredient are generally applied to the infested material to be treated in the form of a liquid by spraying or as a vapor by fumigation in those cases where this is practical. In still other cases it may be applied in the solid state by dusting or other means. In situations where it is to be added to a material prior to final formulation or where it is added to a composition to preserve the material from further deterioration, it is simply added to the formulation prior to final mixing.

In the case of solid carriers, those familiar to the dusting art which are favored for their large surface area such as bentonite, kieselguhr, fuller's earth, clay, pyrophylite talc and the like may be employed. Commercial clay carriers are generally acceptable as are nonclay carriers, like lignocellulose, wood flour and such. When solid compositions are employed, it is desirable that the composition be in finely divided form. Preferably the dust containing the active ingredient should be sufficiently fine that substantially all of the particles will pass through a U.S. Standard Sieve Series No. 200 Screen.

When it is desired to apply the active ingredient by spraying techniques, it may be dissolved or dispersed in a liquid carrier. Although lower aliphatic alcohols are preferred, other suitable liquid carriers are water and various oils and organic solvents in which the organic thiocyanates are known to be soluble or dispersible. Suitable oils include those of mineral, animal, vegetable or synthetic origin such as kerosene, soy bean oil, castor oil, cod liver oil and the like.

If desired, dispersion and emulsion of the active ingredient in a liquid carrier may be effected by agitation in the presence of an emulsifying or dispersing agent in order to assist in the formation of an emulsion or dispersion. In such preparation a number of well known emulsifying and dispersing agents may be employed such as sodium lauryl sulfate, aliphatic and aromatic sulfonates like sulfonated castor oil or various alkaryl sulfonates such as the sodium salt of mono sulfonated nonyl naphthalene. Non-ionic types of emulsifying agents such as the higher molecular weight alkyl polyglycol ethers and analogous thio ethers such as the decyl, dodecyl and tetradecyl polyglcol ethers and thio ethers containing from about 25 to 75 carbon atoms may be used. For convenience the emulsifying agent may be mixed with the active ingredient prior to admixture with the carrier and dispersion may be accomplished at the place wherein spraying is to be carried on merely by agitating said mixture. This is particularly important when both water and oil are employed as the carrier. The concentration of surfactant in the final emulsion should be sufficient to make the oil and water phases readily dispersible and in general one will employ from about 0.02 to 3% of the surfactant for purposes of forming a spray emulsion or dispersion. Formulations containing a surface active agent in the amount of from 1 to 20% by weight of active ingredient are satisfactory although such proportion may be varied over a wide range of proportions depending upon the particular circumstances and condition of the material to which the active ingredient is to be added.

In the case where cationic emulsifiers such as alkyl trimethyl ammonium chloride, it is desirous that they be used in combination with a buffering agent to insure that the pH of the liquid being treated does not rise above about pH 8.5 at which point the active ingredient may be impaired by degradation.

Adjuvants such as wetting agents or humectants may, if desired, be employed particularly when compounding an aqueous dispersion. Examples of humectants are glycerine, diethylene glycol, polyethylene glycol and the like. The use of well known wetting agents serve an additional purpose, particularly in spray applications, by aiding penetration of the active ingredient into the pores of the substance treated where such is required.

The range of proportions of inert carrier or diluent to the active ingredient is broad and is not considered to be critical. In many cases from about 0.01% to 2% by weight of the active ingredient has been found adequate for the preparation of most dispersions. In dry compositions up to about 5% of active ingredient is suitable for most applications. It should be understood of course that the active ingredient may be employed by itself or in proportions of much higher concentration if it is desired to be dispensed by aerosol or other like means.

The following examples will serve to illustrate the preparation of treating compositions and some of the more important uses of the organic thiocyanates of the invention. These examples are intended primarily to illustrate the invention and not in limitation thereof except as defined by the appended claims. All parts and percentages are by weight unless otherwise specified.

*Example 1*

Various dilutions of methylene bis thiocyanate were mixed with nutrient salt solutions containing 3 g. of $NH_4NO_3$, 1 g. of $K_2HPO_4$, 0.25 g. KCl and then inoculated with an actively growing culture of green algae (Chlorophyceae). The mixtures were then incubated in sunny areas of a greenhouse for from two to three weeks and examined. Control flasks containing no methylene bis thiocyanate contained typical green algae growths but the flasks which contained 1.6 p.p.m. or more of methylene bis thiocyanate showed no growth of algae.

*Example 2*

Three species of algae were grown separately on Chu's mineral salts medium (J. of Ecology, 30, 284–325, 1942) in 250 ml. Erlenmyer flasks (100 ml. culture medium) using natural daylight (northeast exposure) and room temperature. Two green algae, Ankistrodesmus and Chlamydomonas species, and one blue-green Phormidium species (commonly known as "Black" algae), were used. Luxuriant growth of all three species was obtained within two weeks of inoculation with a 1% vol./vol. suspension of active algal culture.

Toxicant dilutions of methylene bisthiocyanate (MBT) and chloromethyl thiocyanate (CMT) were prepared in Chu's mineral salts solution. Duplicate 125 ml. flasks containing 50 ml. of mineral salts/toxicant dilutions were set up at toxicant levels of 25, 12.5, 6.25, 3.1, 1.6 and 0.8 p.p.m. for each algal strain under test. These flasks plus suitable control flasks were inoculated with 2% vol./vol. of algal culture and incubated as described above. At the end of a two week period the flasks were examined visually to determine if the algae had multiplied or had been inhibited. The following table indicates the lowest toxicant level expressed in p.p.m.

for no algal growth as compared to the control flasks which contained luxuriant growth.

TABLE I

| | MBT | CMT |
|---|---|---|
| "Black" algae | 12.5 | 3.1 |
| Ankistrodesmus sp. | 3.1 | <0.8 |
| Chlamydomonas sp. | 1.5 | <0.8 |

*Example 3*

Utilizing essentially the same test procedures described in Example 2, control of algae growth was obtained with monobromomethyl thiocyanate at substantially the same toxicant levels.

I claim:

1. A method of inhibiting the growth of algae which comprises contacting said algae with a minor but effective amount of a compound selected from the group consisting of methylene bisthiocyanate and monohalomethyl thiocyanate.

2. A method of inhibiting the growth of algae which comprises contacting said algae with a minor but effective amount of methylene bisthiocyanate.

3. A method of inhibiting the growth of algae which comprises contacting said algae with a minor but effective amount of monochloromethyl thiocyanate.

4. A method of inhibiting growth of algae which comprises contacting said algae with a minor but effective amount of monobromethyl thiocyanate.

References Cited by the Examiner

FOREIGN PATENTS 545,740 3/1932 Germany.

OTHER REFERENCES

Chemical Abstracts, vol. 51, entry 13302 c. 1957, citing Marova et al., Zhur. Priklad. Khim., 30, 650–2, 1957.

Frobisher: Fundamentals of Microbiology, Seventh edition, published by W. B. Saunders Co., Philadelphia, 1962, pp. 18 and 32–34.

Hackh's Chemical Dictionary, Third edition, published by McGraw-Hill Book Co., Inc., New York, 1944, p. 360.

LEWIS GOTTS, *Primary Examiner.*

RICHARD L. HUFF, *Assistant Examiner.*